Sept. 17, 1946. L. SATCHWELL Re 22,793

BOILER

Original Filed Oct. 29, 1942 2 Sheets-Sheet 1

INVENTOR.
LEONARD SATCHWELL
BY
Pennie, Davis, Marvin & Edmonds
ATTORNEYS

Sept. 17, 1946. L. SATCHWELL Re 22,793
BOILER
Original Filed Oct. 29, 1942 2 Sheets-Sheet 2
Fig. 3,
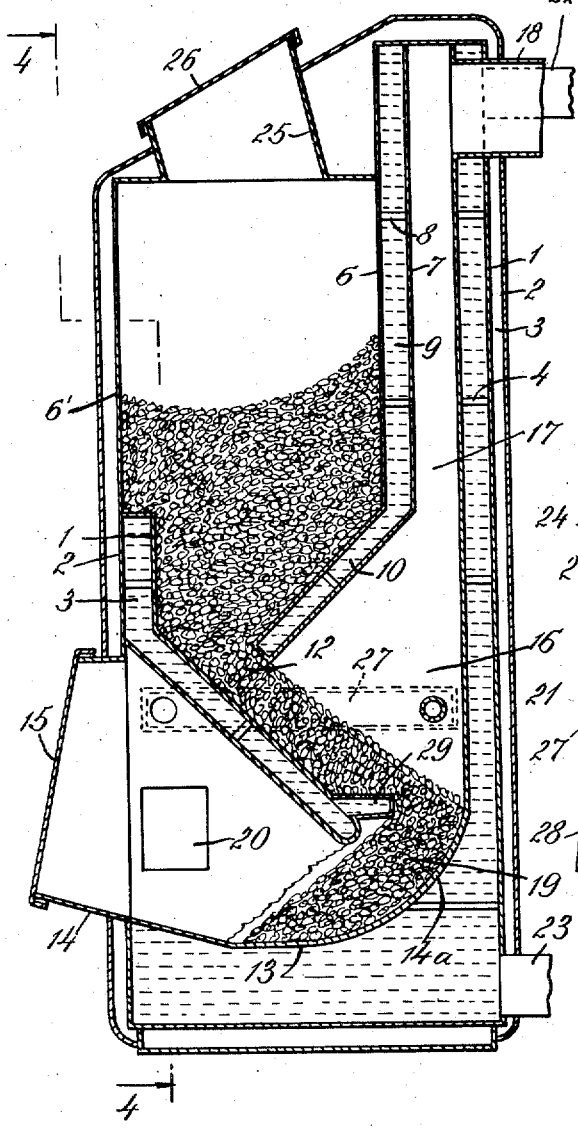
Fig. 4,
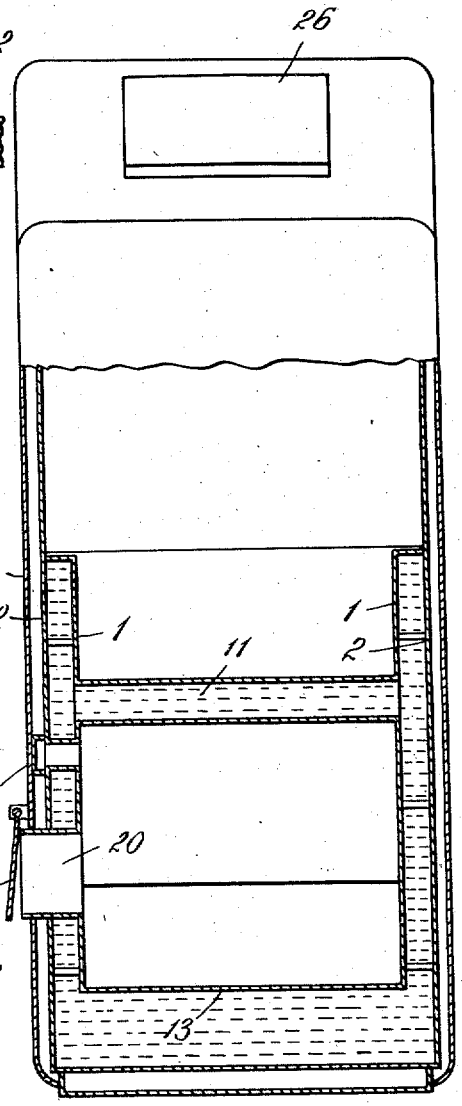
INVENTOR.
LEONARD SATCHWELL
BY
Pennie, Davis, Marvin & Edmonds
ATTORNEYS Reissued Sept. 17, 1946

Re. 22,793

UNITED STATES PATENT OFFICE 22,793

BOILER

Leonard Satchwell, Slough, England

Original No. 2,340,431, dated February 1, 1944, Serial No. 463,735, October 29, 1942. Application for reissue January 17, 1946, Serial No. 641,851

7 Claims. (Cl. 122—30)

This invention relates to boilers for burning solid fuel under natural draught conditions of the kind in which there is provided within the boiler a fuel storage hopper or magazine from which the fuel gravitates to the lower part of the boiler where combustion takes place, the gravitation of the fuel being regulated by the rate of combustion of said fuel.

Boilers, where provided and used for natural draught conditions, usually have a firegrate with several small air orifices on which the fuel is burned, the dimensions of such orifices being chosen with regard to the size of the pieces of fuel ordinarily consumed. Difficulty is experienced with such arrangements because of the readiness with which the air orifices become clogged by the ash and many arrangements have been adopted for moving or shaking said grates by manual or other means so as to keep the air passages sufficiently clear to allow a reasonable rate of combustion to be maintained.

The difficulties referred to above have proved so great in practice that it is now common for such boilers to be supplied with the air necessary for combustion from some pressure source, in an endeavor to maintain the combustion rate.

It has been proposed to avoid these difficulties by providing a boiler in which the fuel is burnt in the form of a pile without a grate under natural draught conditions, and the present invention has for an object to provide an improved form of such boiler. A further object is to ensure that a portion of the fuel will be subjected to a faster rate of combustion than the remainder so as to provide a surface sufficiently high in temperature to ensure ignition of the mixture of combustible gases present in the secondary combustion zone even under light loads. A further object is to provide means for control of the supply of secondary air to mix with these gases so as to ensure efficient combustion under different conditions.

In accordance with a principal feature of the present invention a grateless boiler of the type referred to for burning solid fuel under natural draught conditions is provided with a hopper within the boiler having non-symmetrically disposed inclined water wall portions forming an orifice discharging to form a pile of fuel resting on an imperforate water floor and presenting two fuel faces disposed at an angle in the neighborhood of 90°. An opening or openings is or are provided beneath one inclined wall of the hopper for the introduction of primary air which, entering at one fuel face and passing laterally through that portion of the fuel pile which rests on the imperforate water floor, supports combustion within the pile of fuel, the combustion being completed by secondary air supplied above the other fuel face.

As fuel is consumed, reduction of the pile permits flow from the hopper orifice.

In accordance with a further feature of the invention one inclined wall of the hopper is provided adjacent its lower end over a portion of its width with a projecting portion which serves to reduce the thickness of the pile of fuel adjacent that portion and thus provides a path of less resistance than that presented by the remainder of the pile to the passage of the primary air therethrough as a consequence of which even under light loads the fuel adjacent this portion is maintained at a sufficiently high temperature to ignite the combustible gases given off in the secondary combustion zone.

In accordance with a still further feature of the invention the supply of secondary air to the boiler is controlled in dependence on the supply of primary air so as to ensure the admission of an amount of secondary air only sufficient to ensure combustion of all the gases and prevent the cooling of the chimney by the flow of secondary air when the boiler is operating under light loads and the flow of combustible gases from the pile is reduced.

In the accompanying drawings:

Fig. 3 is a sectional elevation of another embodiment of the invention, and

Fig. 4 is a view along line 4—4 of Fig. 3.

Figure 1:
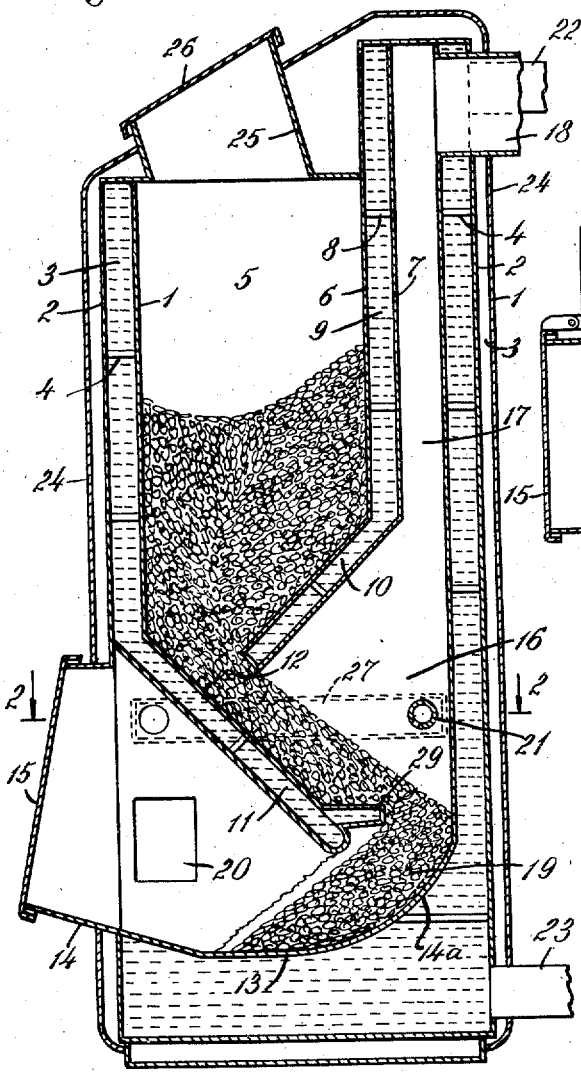
Fig. 1 is a sectional elevation of a boiler embodying the invention.
Figure 2:
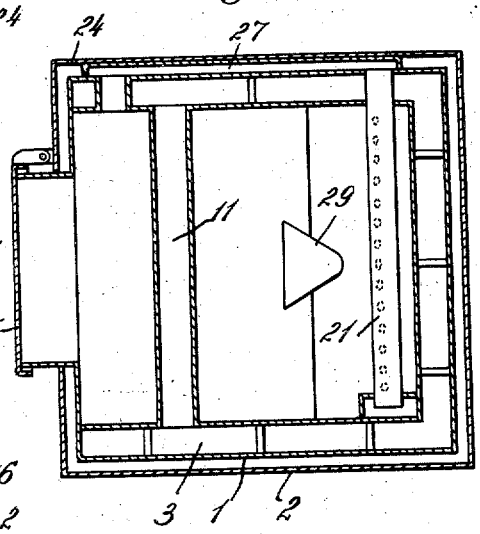
Fig. 2 is a view along line 2—2 of Fig. 1.

Referring now to the drawings, the boiler is constituted by inner and outer walls 1 and 2 providing a water wall 3, the walls 1 and 2 being braced by means of stays 4. 5 indicates the fuel hopper one wall of which is spaced from the adjacent wall of the boiler and is constituted by inner and outer walls 6 and 7 braced by stays 8 defining therebetween a water wall 9. The lower portion 10 of this water wall of the hopper is inclined downwardly towards the opposite side of the boiler. In the construction shown in Fig. 1 the opposite wall is constituted by inner and outer walls 1 and 2 extending from the upper end of the boiler while in the construction shown in Figs. 3 and 4 this upright wall is a water wall for a short distance within the hopper and above that level consists of single plates 6′ as do the two other side walls of the hopper indicated clearly in Fig. 4. The arrangement of the water walls shown in Figs. 3 and 4 is preferred. The lower portion 11 of the wall of the hopper opposite the wall 6, 7 consists of an extension of the water wall defined by the plates 1 and 2 of the boiler. The lower portions 10, 11 of the hopper are non-symmetrically disposed to provide a discharge outlet 12 and a directing wall 11 directing the fuel downwards to the floor 13. The arrangement of the walls 10 and 11 ensures that the fire area is appreciably removed from the outlet of the hopper and prevents the fuel from burning upwards in the hopper. The floor 13 of the boiler is an imperforate water floor and is suitably inclined upwards as indicated at 14 towards a clinker door 15. The spacing of the wall 7 of the hopper from the outer water wall 3 and the inclination of the lower portion of the wall 10 provide a secondary combustion zone 16 with a secondary air inlet manifold 21 and a passage 17 for the flow of combustion gases upwards to a flue 18 disposed at the top of the boiler. The exit of the hopper 5 may be controlled or closed by any suitable device. For example, a sliding damper or the like may be provided to allow the fuel to flow when the boiler is started up, to regulate the flow of fuel and to cut off the supply of fuel before declinkering or drawing of the boiler fire.

The lower portion 11 of the one wall is of greater length than the portion 10 of the other wall and forms as stated above a fuel directing water wall, the surfaces of which are arranged at an angle to allow free movement of the fuel. In one or more walls of the boiler there is provided a large opening 20 to provide for the free admission of air to the pile of fuel 19 disposed between the wall 11 and the floor 13 and combustion takes place by the passage of air through the sloping face of the pile of fuel. From the centre of the lower end of the fuel directing wall 11 extends a projection 29 which modifies the cross section of the central portion of the fuel pile so as to provide a small area through which the length of travel of the primary air is much less than through the remainder of the fuel pile, thus ensuring a faster rate of combustion in this small area and providing a surface on the second fuel face which is always sufficiently high in temperature to ensure ignition of the mixture of the combustible gases present in the secondary combustion zone 16. The wall of the boiler vertical to the floor is inclined or curved as at 14a to meet the floor. The secondary air manifold 21 is connected to the primary air space below the water wall 11 by means of a duct 27, the volume of secondary as well as primary air thus being controlled by the extent of opening of a flap 28 which may be thermostatically controlled. When the boiler is called upon to deliver its full output the thermostatically controlled flap 28 will be open to its full extent, thus supplying the maximum volume of air for both primary and secondary combustion. As the demand on the boiler is reduced the thermostat will cause flap 28 gradually to close so reducing the volume of both primary and secondary combustion air. At times, particularly when the demand on the boiler is very small, flap 28 may actually be closed so that under such circumstances combustion may be almost suspended and it will be obvious that it is very desirable that the supply of secondary air should also be stopped since otherwise the cool secondary air would merely act to cool the hot surfaces of the boiler, thus greatly reducing the boiler efficiency under such conditions. If desired the control of the secondary air supply may be carried out by the provision of a second flap or valve operated by the thermostat which controls the position of flap 28 or alternatively by a second thermostat. If desired, also, the admission of air through the opening 20 can be controlled by a valve or flap attached to a lever controlled by a thermostat disposed in the hot water space of the boiler.

22 and 23 indicate flow and return connections to the heating system.

The whole boiler is enclosed in a substantially rectangular casing 24 built up of welded steel plates. The hopper 5 is provided with an inlet chute 25 covered by a door 26.

I claim:

1. A grateless boiler for burning solid fuel under natural draught conditions, said boiler having an imperforate water floor, a plurality of water walls forming the sides of a fuel hopper within said boiler from which fuel gravitates to said floor to form a pile presenting two fuel faces, means for supplying primary air to one of said fuel faces, a secondary combustion space within said sides and above the other of said fuel faces and means for supplying secondary air thereto, means providing a path of limited area and of low resistance to the passage of primary air through the pile of fuel, and means for controlling the supply of secondary air in dependence on the supply of primary air.

2. A grateless boiler for burning solid fuel under natural draught conditions comprising an imperforate water floor, a plurality of water walls forming the sides of a fuel hopper within the boiler, said hopper including inclined water wall portions, said wall portions being non-symmetrically disposed within the boiler and providing an orifice discharging the fuel to the floor to form a pile presenting two fuel faces, means for supplying primary air for combustion beneath one inclined wall of the hopper so as to enter at one fuel face and pass laterally through the fuel pile, means providing a path of limited area and of low resistance to the passage of primary air through the pile, a secondary combustion space above the other fuel face, means for supplying secondary air thereto to complete the combustion and means controlling the supply of secondary air in dependence on the supply of primary air.

3. A boiler as claimed in claim 2, in which the wall portion of the boiler immediately under the secondary combustion space is curved downwards to meet the floor.

4. A grateless boiler for burning solid fuel under natural draft conditions which comprises an imperforate water floor, a plurality of water walls providing sides for a fuel hopper within the boiler, the lower portions of two opposite water walls sloping towards each other one being short and the other long with a space between the lower extremity of the short sloping water wall and the long sloping water wall, said sloping water walls forming the bottom of the hopper whereby fuel is free to fall through the space and assume a position of repose in a layer on the long sloping water wall, a secondary combustion space for burning fuel on the long sloping water wall, means for suppyling air to the secondary combustion space, an opening at the lower end-portion of the long sloping water wall through which the fuel is free to fall from the secondary combustion space and accumulate on the water floor, means for supplying primary combustion air to burn the fuel accumulated on the water floor, and means providing a path of limited area and low resistance for the passage of combustion gases from the fuel burning on the water floor to the secondary combustion space.

5. A boiler according to claim 4 in which one of the sides slopes inwardly and becomes contiguous with the water floor.

6. A grateless boiler for burning solid fuel under natural draught conditions, said boiler having an imperforate water floor, a plurality of water walls forming the sides of a fuel hopper from which fuel gravitates to the floor to form a pile preventing two fuel faces, means for supplying primary air to one of said fuel faces, a secondary combustion space above the other of said fuel faces and means for supplying secondary air thereto, and means for reducing the cross-section of the fuel pile between the fuel faces.

7. A grateless boiler for burning solid fuel under natural draught conditions comprising an imperforate water floor, a fuel hopper within the boiler, said hopper including inclined water wall portions, said wall portions being non-symmetrically disposed within the boiler and providing an orifice for discharging the fuel to the floor to form a pile presenting two fuel faces, means for supplying primary air for combustion beneath one inclined wall of the hopper so as to enter at one fuel face and pass laterally through the fuel pile, means for reducing the cross-section of the fuel pile between the fuel faces, a secondary combustion space above the other fuel face, and means for supplying secondary air thereto to complete the combustion.

LEONARD SATCHWELL.